(12) United States Patent  
Uzaki (10) Patent No.: US 10,347,297 B2  
(45) Date of Patent: Jul. 9, 2019

(54) MOVING PICTURE PLAYBACK METHOD, MOVING PICTURE PLAYBACK PROGRAM, AND MOVING PICTURE PLAYBACK APPARATUS

(71) Applicant: JVC KENWOOD Corporation, Yokohama-shi, Kanagawa (JP)

(72) Inventor: Jiro Uzaki, Yokohama (JP)

(73) Assignee: JVC KENWOOD CORPORATION, Kanagawa (JP)

( * ) Notice: Subject to any disclaimer, the term of this patent is extended or adjusted under 35 U.S.C. 154(b) by 26 days.

(21) Appl. No.: 15/428,997

(22) Filed: Feb. 9, 2017

(65) Prior Publication Data

US 2017/0229150 A1    Aug. 10, 2017

(30) Foreign Application Priority Data

Feb. 9, 2016    (JP) ................. 2016-022360

(51) Int. Cl.
   *G11B 27/11*    (2006.01)
   *G11B 27/034*    (2006.01)
   (Continued)

(52) U.S. Cl.
   CPC ............ *G11B 27/11* (2013.01); *G11B 27/005* (2013.01); *G11B 27/034* (2013.01); *G11B 27/34* (2013.01); *H04N 5/91* (2013.01)

(58) Field of Classification Search
   None
   See application file for complete search history.

(56) References Cited

U.S. PATENT DOCUMENTS

2009/0063981 A1    3/2009    Kikuchi et al.
2011/0149138 A1*   6/2011    Watkins ............... G06F 3/0485
                                                              348/333.02
(Continued)

FOREIGN PATENT DOCUMENTS

EP    2463860 A1    11/2011
JP    2006-279267    10/2006

OTHER PUBLICATIONS

Selecting a view of a multi-view video published Aug. 24, 2017.*

*Primary Examiner* — William C Vaughn, Jr.
*Assistant Examiner* — Daniel T Tekle
(74) *Attorney, Agent, or Firm* — Procopio, Cory, Hargreaves & Savitch LLP (57) ABSTRACT

A moving picture playback method including detecting a first location in a moving picture display area indicated by a user, detecting a frame at a time point at which the user indicated the first location, determining whether the first location is located in one of two divided areas of the moving picture display area or in the other thereof, generating a first number of thumbnails of frames temporally subsequent to the detected frame when the first location is located in the one of the two divided areas, and generating a second number of thumbnails of frames temporally previous to the detected frame when the first location is located in the other, displaying the generated thumbnails in the moving picture display area, detecting a thumbnail selected from among the displayed thumbnails by the user, and playing back a moving picture at a frame corresponding to the detected thumbnail and subsequent frames.

7 Claims, 8 Drawing Sheets

(51) Int. Cl.
 G11B 27/34 (2006.01)
 H04N 5/91 (2006.01)
 G11B 27/00 (2006.01)

(56) References Cited

U.S. PATENT DOCUMENTS

2012/0141088 A1* 6/2012 Isozu .................. G11B 27/005
 386/230
2013/0307792 A1 11/2013 Andres et al.

* cited by examiner

MOVING PICTURE PLAYBACK METHOD, MOVING PICTURE PLAYBACK PROGRAM, AND MOVING PICTURE PLAYBACK APPARATUS

CROSS REFERENCE TO RELATED APPLICATION

This application is based upon and claims the benefit of priority from Japanese patent application No. 2016-022360, filed on Feb. 9, 2016, the disclosure of which is incorporated herein in its entirety by reference.

BACKGROUND

The present invention relates to a moving picture playback method, a moving picture playback program, and a moving picture playback apparatus.

The development of a moving picture playback method for allowing a user to recognize the overall content of moving picture data has been underway. For example, Japanese Unexamined Patent Application Publication No. 2006-279267 discloses a technique for a moving picture division display method in which: moving picture data is divided at predetermined time intervals; the first frame of each of the time-divided moving picture data is taken out as still picture data in a time-series manner; and a plurality of thumbnails are thereby generated and displayed.

SUMMARY

However, the present inventors have found the following problem. In the related-art moving picture playback method, positioning a moving picture to a scene that a user wants to watch in a rewinding or fast-forwarding operation is complicated and playing back the moving picture from a desired scene is very difficult. Further, a user needs to perform a plurality of operation steps when he/she wants to play back a scene that is in a fast-forwarding or rewinding direction.

Therefore, a first exemplary aspect of the present invention is a moving picture playback method including: a location detection step of detecting a first location in a moving picture display area indicated by a user; a frame detection step of detecting a frame at a time point at which the user indicated the first location; a location determination step of determining whether the first location is located in one of two divided areas or in the other thereof, the two divided areas being obtained by dividing the moving picture display area into two parts; a thumbnail generation step of generating a first number of thumbnails of frames temporally subsequent to the detected frame when the first location is located in the one of the two divided areas of the moving picture display area, and generating a second number of thumbnails of frames temporally previous to the detected frame when the first location is located in the other of the two divided areas of the moving picture display area; a thumbnail display instruction step of displaying the generated first or second number of thumbnails in the moving picture display area; a selection detection step of detecting a thumbnail selected from among the displayed first or second number of thumbnails by the user; and a moving picture playback instruction step of playing back a moving picture at a frame corresponding to the detected thumbnail and subsequent frames, and thereby displaying the moving picture in the moving picture display area.

Further, another exemplary aspect of the present invention is a moving picture playback program for causing a computer to execute: a location detection process of detecting a first location in a moving picture display area indicated by a user; a frame detection process of detecting a frame at a time point at which the user indicated the first location; a location determination process for determining whether the first location is located in one of two divided areas or in the other thereof, the two divided areas being obtained by dividing the moving picture display area into two parts; a thumbnail generation process of generating a first number of thumbnails of frames temporally subsequent to the detected frame when the first location is located in the one of the two divided areas of the moving picture display area, and generating a second number of thumbnails of frames temporally previous to the detected frame when the first location is located in the other of the two divided areas of the moving picture display area; a thumbnail display instruction process of displaying the generated first or second number of thumbnails in the moving picture display area; a selection detection process of detecting a thumbnail selected from among the displayed first or second number of thumbnails by the user; and a moving picture playback instruction process of playing back a moving picture at a frame corresponding to the detected thumbnail and subsequent frames, and thereby displaying the moving picture in the moving picture display area.

Further, another exemplary aspect of the present invention is a moving picture playback apparatus including: a location detection unit configured to detect a first location in a moving picture display area indicated by a user; a frame detection unit configured to detect a frame at a time point at which the user indicated the first location; a location determination unit configured to determine whether the first location is located in one of two divided areas or in the other thereof, the two divided areas being obtained by dividing the moving picture display area into two parts; a thumbnail generation unit configured to generate a first number of thumbnails of frames temporally subsequent to the detected frame when the first location is located in the one of the two divided areas of the moving picture display area, and generate a second number of thumbnails of frames temporally previous to the detected frame when the first location is located in the other of the two divided areas of the moving picture display area; a thumbnail display instruction unit configured to display the generated first or second number of thumbnails in the moving picture display area; a selection detection unit configured to detect a thumbnail selected from among the displayed first or second number of thumbnails by the user; and a moving picture playback instruction unit configured to play back a moving picture at a frame corresponding to the detected thumbnail and subsequent frames, and thereby display the moving picture in the moving picture display area.

According to the exemplary embodiment, it is possible to provide a moving picture playback method, a moving picture playback program, and a moving picture playback apparatus capable of allowing a user to search for a scene the user wants to watch that is in a fast-forwarding or rewinding direction through fewer operation steps and easily play back a moving picture.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

A moving picture playback apparatus and a moving picture playback method according to each exemplary embodiment are explained hereinafter with reference to the drawings.

First Exemplary Embodiment

A moving picture playback apparatus or a moving picture playback method according to a first exemplary embodiment is for generating a plurality of thumbnails (reduced-size images) of frames temporally previous to a current frame (i.e. a frame at the present time) or a plurality of thumbnails of frames temporally subsequent to the current frame according to the location in a moving picture display area indicated by a user, displaying the generated thumbnails in the moving picture display area, and playing back a moving picture at a frame corresponding to a thumbnail selected by the user and the subsequent frames.

Firstly, a configuration of the moving picture playback apparatus according to the first exemplary embodiment is explained.

Figure 1:
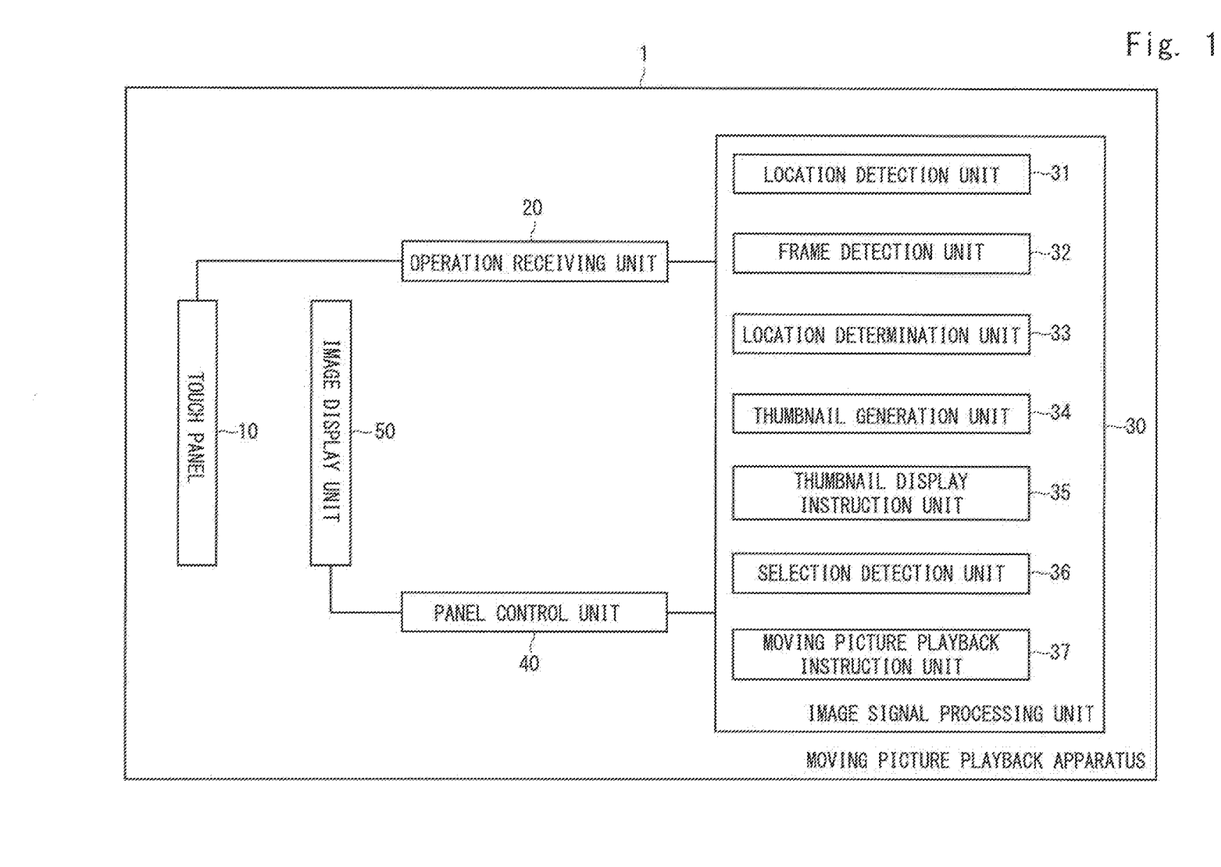
FIG. 1 is a block diagram showing a schematic configuration of a moving picture playback apparatus 1 according to a first exemplary embodiment.

FIG. 1 is a block diagram showing a schematic configuration of a moving picture playback apparatus 1 according to the first exemplary embodiment.

The moving picture playback apparatus 1 includes a touch panel 10, an operation receiving unit 20, an image signal processing unit 30, a panel control unit 40, an image display unit 50, and so on. Examples of the moving picture playback apparatus 1 include a tablet PC (Personal Computer), a smartphone, and a camcorder.

The touch panel 10 is mounted (or formed) over the entire image display surface of the image display unit 50. A user touches the touch panel 10 with his/her finger or the like and thereby operates the moving picture playback apparatus 1.

The operation receiving unit 20 receives an instruction entered by the user by touching the touch panel 10 and outputs the received instruction to the image signal processing unit 30.

In response to the user's instruction, the image signal processing unit 30 generates a plurality of thumbnails of frames and outputs the generated thumbnails to the panel control unit 40. Further, in response to the user's instruction, the image signal processing unit 30 instructs the panel control unit 40 to output a moving picture at a frame corresponding to a thumbnail displayed in the image display unit 50 and the subsequent frames.

To that end, the image signal processing unit 30 includes a location detection unit 31, a frame detection unit 32, a location determination unit 33, a thumbnail generation unit 34, a thumbnail display instruction unit 35, a selection detection unit 36, a moving picture playback instruction unit 37, and so on. Details of configurations of these components will be described later.

The panel control unit 40 controls the image display unit 50 so that thumbnails or a moving image are properly displayed in the image display unit 50.

The image display unit 50 displays thumbnails or a moving image. The image display unit 50 is, for example, a liquid crystal panel.

Note that each component of the image signal processing unit 30 can be implemented by, for example, executing a program under the control of an arithmetic device (not shown) included in the image signal processing unit 30, which is, for example, a computer. More specifically, the image signal processing unit 30 implements each component thereof by loading a program stored in a storage unit (not shown) into a main storage device (not shown) and executing the program under the control of the arithmetic device. Further, each component does not necessarily have to be implemented by software by using a program. That is, each component may be implemented by any combination of hardware, firmware, software, and the like.

The above-described program can be stored in various types of non-transitory computer readable media and thereby supplied to the image signal processing unit 30. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)).

Further, the program can be supplied to the image signal processing unit 30 by using various types of transitory computer readable media. Examples of the transitory computer readable media include an electrical signal, an optical signal, and an electromagnetic wave. The transitory computer readable media can be used to supply programs to the image signal processing unit 30 through a wire communication path such as an electrical wire and an optical fiber, or wireless communication path.

Next, an operation of the moving picture playback apparatus 1 according to the first exemplary embodiment, i.e., a moving picture playback method is explained.

Figure 2:
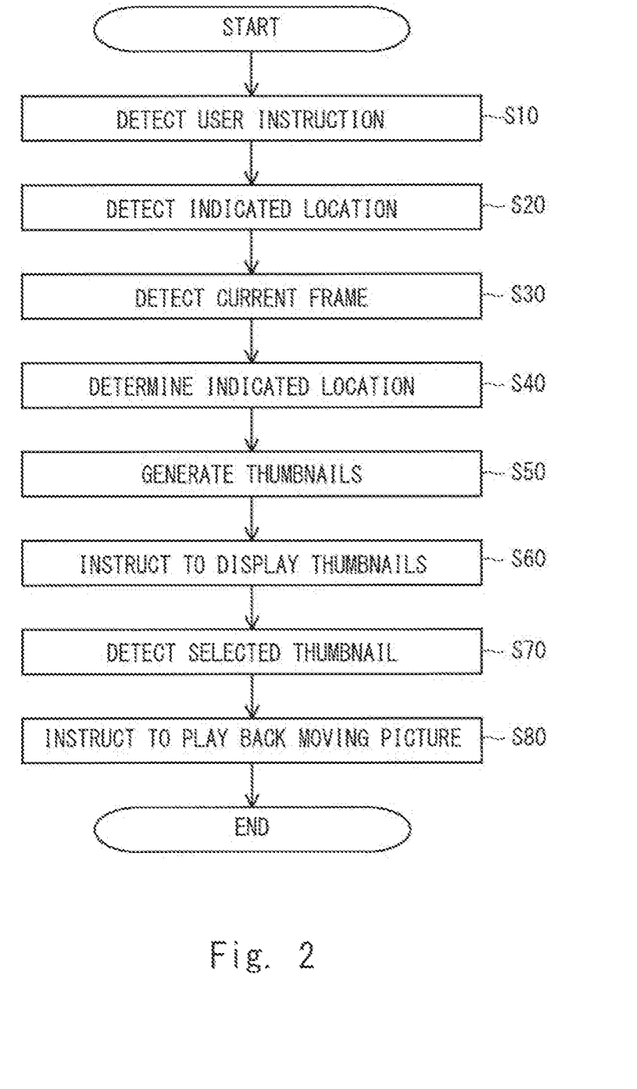
FIG. 2 is a flowchart showing a processing procedure of a moving picture playback method according to the first exemplary embodiment.

FIG. 2 is a flowchart showing a processing procedure of a moving picture playback method according to the first exemplary embodiment.

Firstly, when a user long-presses (i.e., keeps pressing for a while) at a part of the touch panel 10, which corresponds to the moving picture display area, while the moving picture playback apparatus 1 is playing back a moving picture in the entire area or a part of the area of the image display unit 50 or has temporarily stopped the playback of the moving picture, the operation receiving unit 20 detects the long-press action and outputs information about that operation to the image signal processing unit 30 (step S10).

Note that in the specification of the present application, the "moving picture display area" may indicate an area in which a moving picture is displayed, or may indicate an area including an area in which a moving picture is displayed and an area around it in which various icons and the like are displayed. For example, the "moving picture display area" may indicate a window area. Further, when the area in which a moving picture is displayed or the window area occupies the entire area of the image display unit 50, the entire area of the image display unit 50 is the "moving picture display area".

Figure 3A:
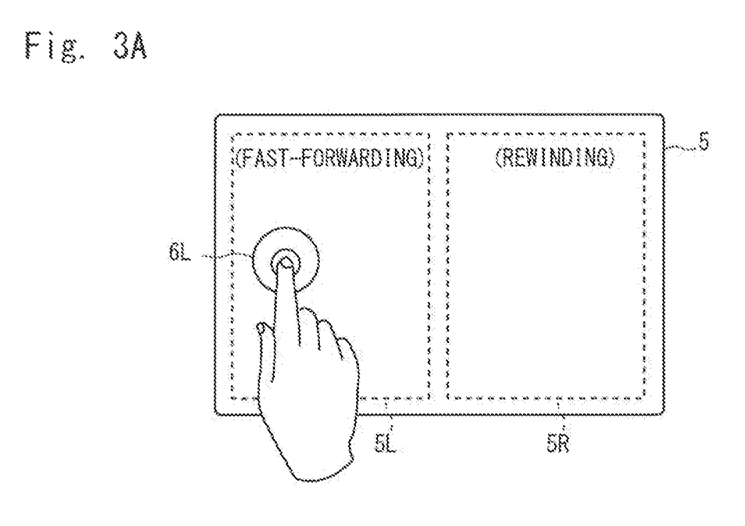
FIG. 3A shows diagrams for explaining a user instruction process in the moving picture playback method according to the first exemplary embodiment.
Figure 3B:
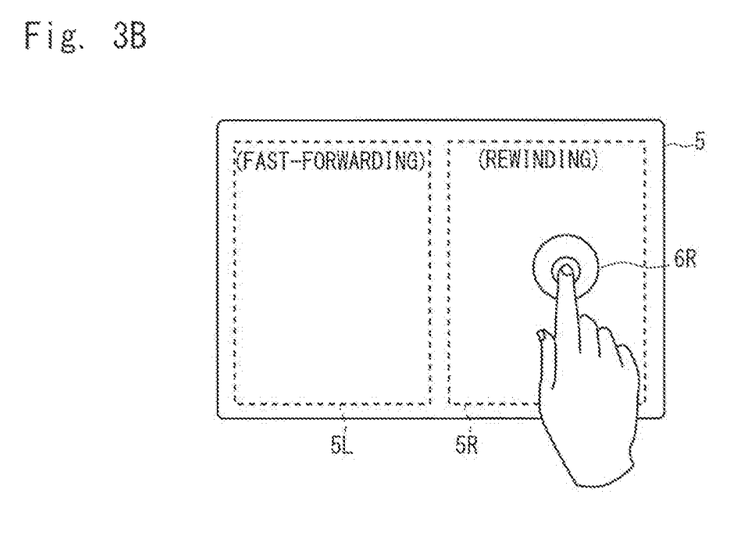
FIG. 3B shows diagrams for explaining a user instruction process in the moving picture playback method according to the first exemplary embodiment.

FIGS. 3A and 3B are diagrams for explaining a user instruction process in the moving picture playback method according to the first exemplary embodiment. In particular, FIG. 3A shows an instruction method that is performed when a user has instructed the moving picture playback apparatus to perform a fast-forwarding operation and FIG. 3B shows an instruction method that is performed when the user has instructed the moving picture playback apparatus to perform a rewinding operation.

The moving picture display area 5 is divided into two sections, i.e., a fast-forwarding instruction area 5L and a rewinding instruction area 5R in advance. Note that in FIGS. 3A and 3B, each of the fast-forwarding instruction area 5L and the rewinding instruction area 5R is indicated by broken lines and text. However, such broken lines and text do not necessarily have to be displayed in an actual moving picture display area 5. Further, ends of the moving picture display area 5, the fast-forwarding instruction area 5L, and the rewinding instruction area 5R may coincide with each other. Further, the moving picture display area 5 does not necessarily have to be divided into two left-right sections as shown in FIGS. 3A and 3B. That is, the moving picture display area 5 may be divided into upper-lower sections, two sections divided by a diagonal line, or other types of two sections.

When a user instructs the moving picture playback apparatus 1 to perform a fast-forwarding operation, the user long-presses any part of the fast-forwarding instruction area 5L. Further, when the user instructs the moving picture playback apparatus 1 to perform a rewinding operation, the user long-presses any part of the rewinding instruction area 5R.

Next, the location detection unit 31 detects the location (a first location) 6L or 6R in the moving picture display area 5 where the user performed the long-press action in the step S10 and outputs the detected location to the location determination unit 33 (step S20). Note that the location detection unit 31 can detect the location 6L or 6R by, for example, receiving location information (coordinates) from the operation receiving unit 20.

Further, the frame detection unit 32 detects a frame at the time point at which the user performed the long-press action in the step S10 and outputs the detected frame to the thumbnail generation unit 34 (step S30). It should be noted that in the case where the user performs the long-press action while the moving picture playback apparatus is playing back a moving picture, the frame at the time point at which the user performs the long-press action is, for example, a frame that was displayed at the moment when the user started the long-press action or a frame that is displayed in a temporarily-stopped state in response to the long-press action. Further, in the case where the user performs the long-press action while the moving picture playback apparatus is displaying a moving picture in a temporarily-stopped state, the frame at the time point at which the user performs the long-press action is, for example, a frame that is displayed in the temporarily-stopped state. That is, it is possible to determine which frame should be defined as the frame at the time of the long-press action in advance.

Note that the order of the steps S20 and S30 may be arbitrarily determined or they may be simultaneously performed in the moving picture playback method according to the first exemplary embodiment.

Next, the location determination unit 33 determines whether the location 6 where the user performed the long-press action is located in one of the two divided areas of the moving picture display area or in the other of thereof, i.e., determines which of the fast-forwarding instruction area 5L and the rewinding instruction area 5R the location 6 is located, and outputs the determination result to the thumbnail generation unit 34 (step S40).

Next, when the location 6 where the user has performed the long-press action is located in the fast-forwarding instruction area 5L, the thumbnail generation unit 34 generates a plurality of (a first number of) thumbnails of frames that are temporally subsequent to the frame detected by the frame detection unit 32 in the step S30 and outputs the generated thumbnails to the thumbnail display instruction unit 35. Further, when the location 6 where the user has performed the long-press action is located in the rewinding instruction area 5R, the thumbnail generation unit 34 generates a plurality of (a second number of) thumbnails of frames that are temporally previous to the frame detected by the frame detection unit 32 and outputs the generated thumbnails to the thumbnail display instruction unit 35 (step S50).

Note that when the thumbnail generation unit 34 generates a plurality of thumbnails, the thumbnail generation unit 34 may generate a predetermined number of thumbnails that are obtained by dividing all the frames between the frame detected by the frame detection unit 32 and the last frame of the moving picture or between the first frame of the moving picture and the frame detected by the frame detection unit 32 into the predetermined number of equal sections. Alternatively, the thumbnail generation unit 34 may generate an arbitrary number of thumbnails by arbitrarily defining a time interval for the frames from which the thumbnails are generated (for example, generating six thumbnails at intervals of five minute or generating nine thumbnails at intervals of three minutes). To that end, the number of frames temporally subsequent to the detected frame (i.e., the first number) may be equal to or different from the number of frames temporally previous to the detected frame (i.e., the second number).

Next, the thumbnail display instruction unit 35 instructs the image display unit 50 to display the first or second number of thumbnails generated by the thumbnail generation unit 34 in the step S50 through the panel control unit 40 (step S60).

Figure 4A:
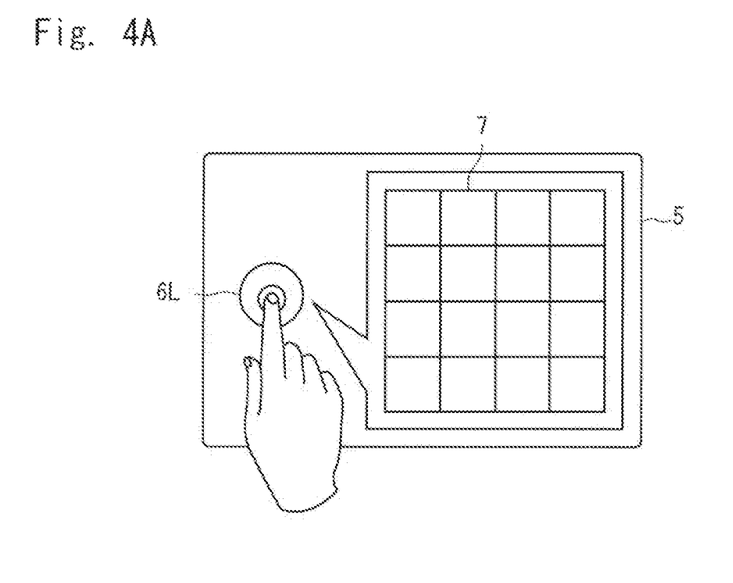
FIG. 4A is a diagram for explaining a thumbnail display process in the moving picture playback method according to the first exemplary embodiment.
Figure 4B:
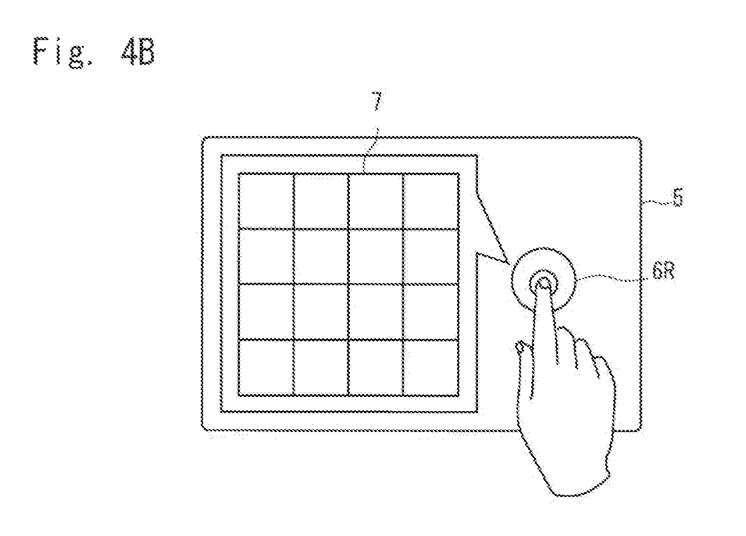
FIG. 4B is a diagram for explaining a thumbnail display process in the moving picture playback method according to the first exemplary embodiment.

FIGS. 4A and 4B are diagrams for explaining a thumbnail display process in the moving picture playback method according to the first exemplary embodiment. In particular, FIG. 4A shows a method for displaying thumbnails 7 that is performed when a user has instructed the moving picture playback apparatus to perform a fast-forwarding operation and FIG. 4B shows a method for displaying the thumbnails 7 that is performed when the user has instructed the moving picture playback apparatus to perform a rewinding operation.

When a user long-presses a part of the fast-forwarding instruction area 5L (the first location 6L) in the step S10 and thereby instructs the moving picture playback apparatus to perform a fast-forwarding operation, the thumbnail display instruction unit 35 displays the first number of thumbnails 7 on the rewinding instruction area 5R side (on the right side of the first location 6L in FIG. 4A) in the form of, for example, a matrix with m rows and n columns (each of m and n is an integer no less than one). Further, when the user long-presses a part of the rewinding instruction area 5R (the first location 6R) in the step S10 and thereby instructs the moving picture playback apparatus to perform a rewinding operation, the thumbnail display instruction unit 35 displays the second number of thumbnails 7 on the fast-forwarding instruction area 5L side (on the left side of the first location 6R in FIG. 4B) in the form of, for example, a matrix with m rows and n columns.

Note that the thumbnail display instruction unit 35 may display the thumbnails 7 in any kind of arrangement, provided that the thumbnails 7 can be displayed without overlapping the part (the first location 6L or 6R) where the user is performing the long-press action. Although the thumbnails 7 are displayed in a balloon in each of FIGS. 4A and 4B, such a balloon may be omitted.

Next, the selection detection unit 36 detects which of the thumbnails 7 displayed in the step S60 the user has selected and outputs information about the detection to the moving picture playback instruction unit 37 (step S70).

Figure 5A:
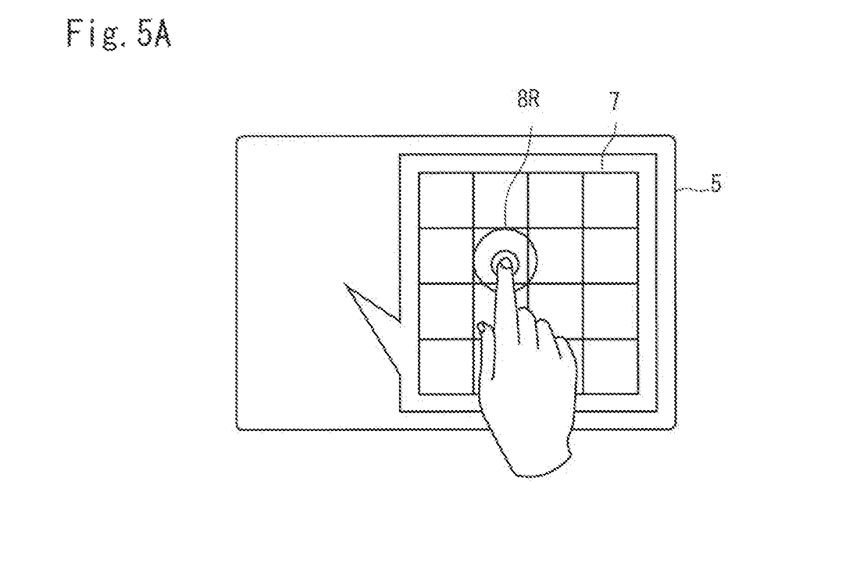
FIG. 5A is a diagram for explaining a thumbnail selection process in the moving picture playback method according to the first exemplary embodiment.
Figure 5B:
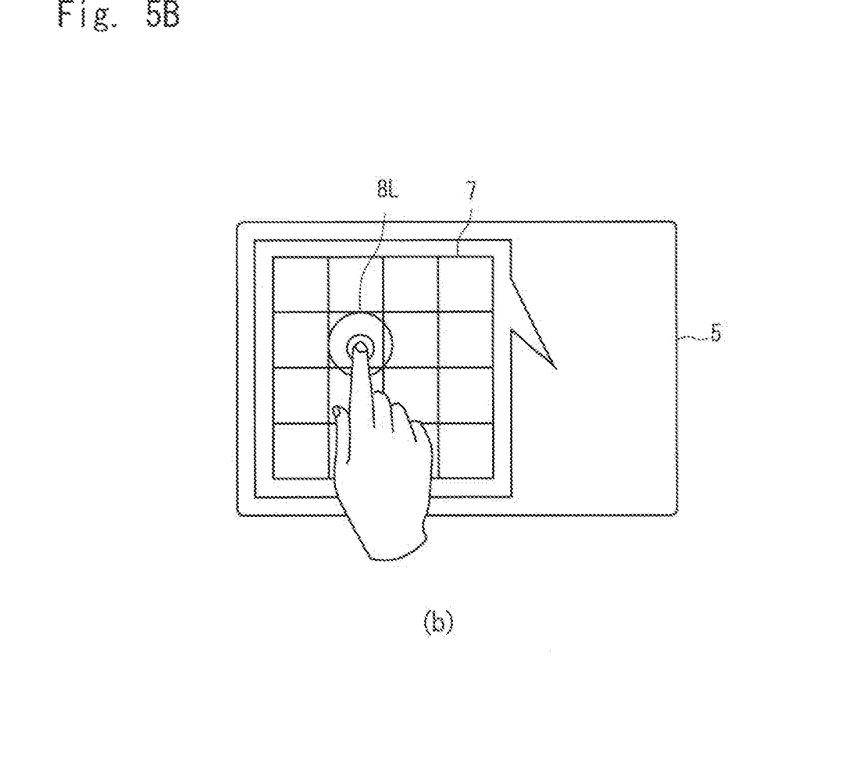
FIG. 5B is a diagram for explaining a thumbnail selection process in the moving picture playback method according to the first exemplary embodiment.

FIGS. 5A and 5B are diagrams for explaining a thumbnail selection process in the moving picture playback method according to the first exemplary embodiment. In particular, FIG. 5A shows a method for selecting a thumbnail 7 that is performed when a user has instructed the moving picture playback apparatus to perform a fast-forwarding operation and FIG. 5B shows a method for selecting a thumbnail 7 that is performed when the user has instructed the moving picture playback apparatus to perform a rewinding operation.

After the thumbnails are displayed in the image display unit 50 in the step S60, the user checks the displayed thumbnails and selects a thumbnail 7 (e.g., one of the thumbnails 7) of a scene that the user wants to watch (hereinafter also referred to as a "desired scene"). Note that the user can select the thumbnail 7 of the desired scene by sliding his/her finger from the first location 6L or 6R where the user has long-pressed the touch panel 10, i.e., without detaching his/her finger from the first location 6L or 6R, to a location 8R or 8L where the thumbnail 7 of the desired scene is located. Alternatively, the user can select the thumbnail 7 of the desired scene by temporarily detaching his/her finger from the touch panel 10 and then touching the touch panel 10 with his/her finger again.

Next, the moving picture playback instruction unit 37 instructs the image signal processing unit 30 to play back the whole moving picture at the frame corresponding to the thumbnail selected by the user in the step S70 and the subsequent frames, or play back at least a part of the moving picture, and instructs the image display unit 50 to display the moving picture through the panel control unit 40.

As described above, the moving picture playback apparatus 1 or the moving picture playback method according to the first exemplary embodiment generates a plurality of thumbnails of frames temporally previous to the current frame (i.e. a frame at the present time) or a plurality of thumbnails of frames temporally subsequent to the current frame according to the location in the moving picture display area 5 indicated by a user, displays the generated thumbnails in the moving picture display area 5, and plays back a moving picture at a frame corresponding to a thumbnail selected by the user and the subsequent frames. As a result, it is possible to allow the user to search for a scene the user wants to watch that is in a fast-forwarding or rewinding direction through fewer operation steps and easily play back a moving picture.

Note that the moving picture playback apparatus 1 and the moving picture playback method according to the first exemplary embodiment are explained above by using an example case where the moving picture playback apparatus 1 is formed as a tablet PC or the like and a user enters each instruction by touching its touch panel with his/her finger. However, a user may enter each instruction in a noncontact manner by using a component or the like that can be operated by a noncontact manner, instead of using the touch panel. Alternatively, the moving picture playback apparatus 1 may be formed as a notebook PC (Personal Computer), a desktop PC, or the like and a user may enter each instruction by using a mouse. In such a case, the user may perform a click action and/or a drag-and-drop action of the mouse, instead of performing a tapping action and/or a sliding action with his/her finger. Further, motion recognition means, line-of-sight recognition means, or the like may be used as input means, instead of using the touch panel, the mouse, or the like.

Further, in the moving picture playback apparatus 1 or the moving picture playback method according to the first exemplary embodiment, the moving picture playback apparatus is integrally formed as the tablet PC or the like. However, the location detection unit 31, the frame detection unit 32, the location determination unit 33, the thumbnail generation unit 34, the thumbnail display instruction unit 35, the selection detection unit 36, the moving picture playback instruction unit 37 and the like may be formed (or provided) as a moving picture playback instruction apparatus separately from the moving picture playback apparatus such as the tablet PC.

Further, in the moving picture playback apparatus 1 or the moving picture playback method according to the first exemplary embodiment, the thumbnail generation unit 34 generates thumbnails of a predetermined number of frames or thumbnails obtained by dividing frames at arbitrary time intervals. However, a user may enter (or insert) tags in a moving picture in advance and the thumbnail generation unit 34 may generate thumbnails of frames corresponding to the tags.

For example, a user may enter (or insert) a tag in a goal scene or the like when the user is recording or playing back a moving picture related to a sport. Then, when the user long-presses the moving picture display area 5 and thereby instructs the moving picture playback apparatus to perform a fast-forwarding operation or a rewinding operation, the thumbnail generation unit 34 may generate a thumbnail of a frame corresponding to that goal scene or the like.

Further, a user may enter (or insert) a tag in a moving picture in advance. Then, when the user long-presses the moving picture display area 5 and the thumbnail generation unit 34 generates thumbnails of a predetermined number of frames or thumbnails obtained by dividing frames at arbitrary time intervals, if a frame of which a thumbnail is to be generated is related to the tag, indication indicating that the thumbnail is related to the tag may be added (i.e., displayed). Alternatively, the thumbnail generation unit 34 may generate both the predetermined number of thumbnails or thumbnails of frames at arbitrary time intervals and the thumbnail corresponding to the tag.

Further, when the thumbnail generation unit 34 generates thumbnails of a predetermined number of frames or thumbnails of frames at arbitrary time intervals, the thumbnail generation unit 34 may generate a thumbnail of a frame corresponding to a tag as a substitute thumbnail when the tag is located near one of a predetermined number of frames or one of the frames at arbitrary time intervals.

Figure 6:
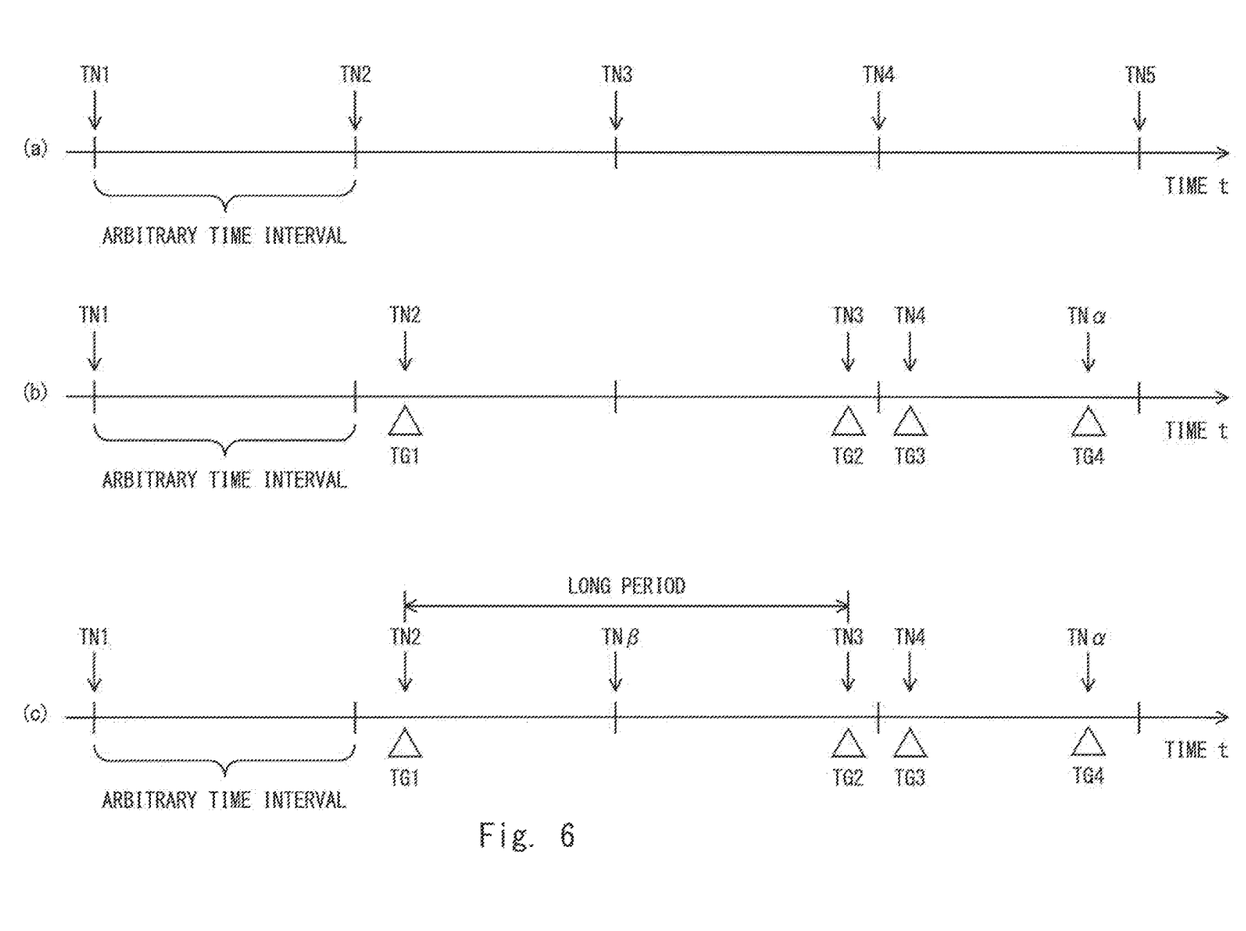
FIG. 6 is a diagram for explaining some examples of a thumbnail generation process in the moving picture playback method according to the first exemplary embodiment.

FIG. 6 is a diagram for explaining some examples of a thumbnail generation process in the moving picture playback method according to the first exemplary embodiment.

As shown in FIG. 6(*a*), the thumbnail generation unit 34 can generate each of thumbnails TN1 to TN5 of frames that are located at arbitrary time intervals.

Further, as shown in FIG. 6(*b*), when there is no tag during the arbitrary time interval, the thumbnail generation unit 34 may generate a thumbnail TN1 of the first frame in that time interval. Further, when there are tags TG1 to TG4 in arbitrary time intervals, the thumbnail generation unit 34 can generate thumbnails TN2 to TN4 and TNa of all the frames located at TG1 to TG4, respectively. Needless to say, the thumbnail generation unit 34 can generate a plurality of thumbnails TNs in one arbitrary time interval as in the case of the thumbnails TN4 and TNα.

Further, as shown in FIG. 6(*c*), when there are tags TG1 to TG4 in arbitrary time intervals and hence the thumbnail generation unit 34 has generated thumbnails TN2 to TN4 and TNα, respectively, but there is a long time period between neighboring thumbnails as in the case of the time period between the thumbnails TN2 and TN3, the thumbnail generation unit 34 can further generate a thumbnail TNβ.

Note that a user may manually enter (or insert) tags. Alternatively, the apparatus may automatically enter (or insert) tags in certain scenes such as a scene in which a voice level is high and a scene in which panning of a camera is large. Further, a plurality of methods for entering (or inserting) tags may be combined with one another.

As has been described so far, a moving picture playback method according to the first exemplary embodiment includes: a location detection step S20 of detecting a first location 6 in a moving picture display area 5 indicated by a user; a frame detection step S30 of detecting a frame at a time point at which the user indicated the first location; a location determination step S40 of determining whether the first location 6 is located in one of two divided areas 5L or in the other thereof 5R, the two divided areas being obtained by dividing the moving picture area 5 into two parts; a thumbnail generation step S50 of generating a first number of thumbnails 7 of frames temporally subsequent to the detected frame when the first location 6 is located in the one of the two divided areas 5L of the moving picture display area 5, and generating a second number of thumbnails 7 of frames temporally previous to the detected frame when the first location 6 is located in the other of the two divided areas 5R of the moving picture display area 5; a thumbnail display instruction step S60 of displaying the generated first or second number of thumbnails 7 in the moving picture display area 5; a selection detection step S70 of detecting a thumbnail 7 selected from among the displayed first or second number of thumbnails 7 by the user; and a moving picture playback instruction step S80 of playing back a moving picture at a frame corresponding to the detected thumbnail 7 and subsequent frames, and thereby displaying the moving picture in the moving picture display area 5.

Further, a moving picture playback apparatus 1 according to the first exemplary embodiment includes: a location detection unit 31 configured to detect a first location 6 in a moving picture display area 5 indicated by a user; a frame detection unit 32 configured to detect a frame at a time point at which the user indicated the first location; a location determination unit 33 configured to determine whether the first location 6 is located in one of two divided areas 5L or in the other thereof 5R, the two divided areas being obtained by dividing the moving picture area 5 into two parts; a thumbnail generation unit 34 configured to generate a first number of thumbnails 7 of frames temporally subsequent to the detected frame when the first location 6 is located in the one of the two divided areas 5L of the moving picture display area 5, and generate a second number of thumbnails 7 of frames temporally previous to the detected frame when the first location 6 is located in the other of the two divided areas 5R of the moving picture display area 5; a thumbnail display instruction unit 35 configured to display the generated first or second number of thumbnails 7 in the moving picture display area 5; a selection detection unit 36 configured to detect a thumbnail 7 selected from among the displayed first or second number of thumbnails 7 by the user; and a moving picture playback instruction unit 37 configured to play back a moving picture at a frame corresponding to the detected thumbnail 7 and subsequent frames, and thereby display the moving picture in the moving picture display area 5.

Second Exemplary Embodiment

A moving picture playback apparatus or a moving picture playback method according to a second exemplary embodiment is for, when a plurality of thumbnails of frames in a fast-forwarding direction or a rewinding direction are generated and displayed in a moving picture playback display area, re-generating and re-displaying thumbnails while changing the number of thumbnails based on an instruction from a user so that the user can search for a thumbnail more easily and/or the thumbnails can be viewed more easily (or can be displayed in a more easy-to-view arrangement).

A configuration of a moving picture playback apparatus according to the second exemplary embodiment may be similar to that of the moving picture playback apparatus 1 according to the first exemplary embodiment, and therefore the configuration of the moving picture playback apparatus according to the second exemplary embodiment is not shown in the drawings and its explanation is omitted here.

Figure 7:
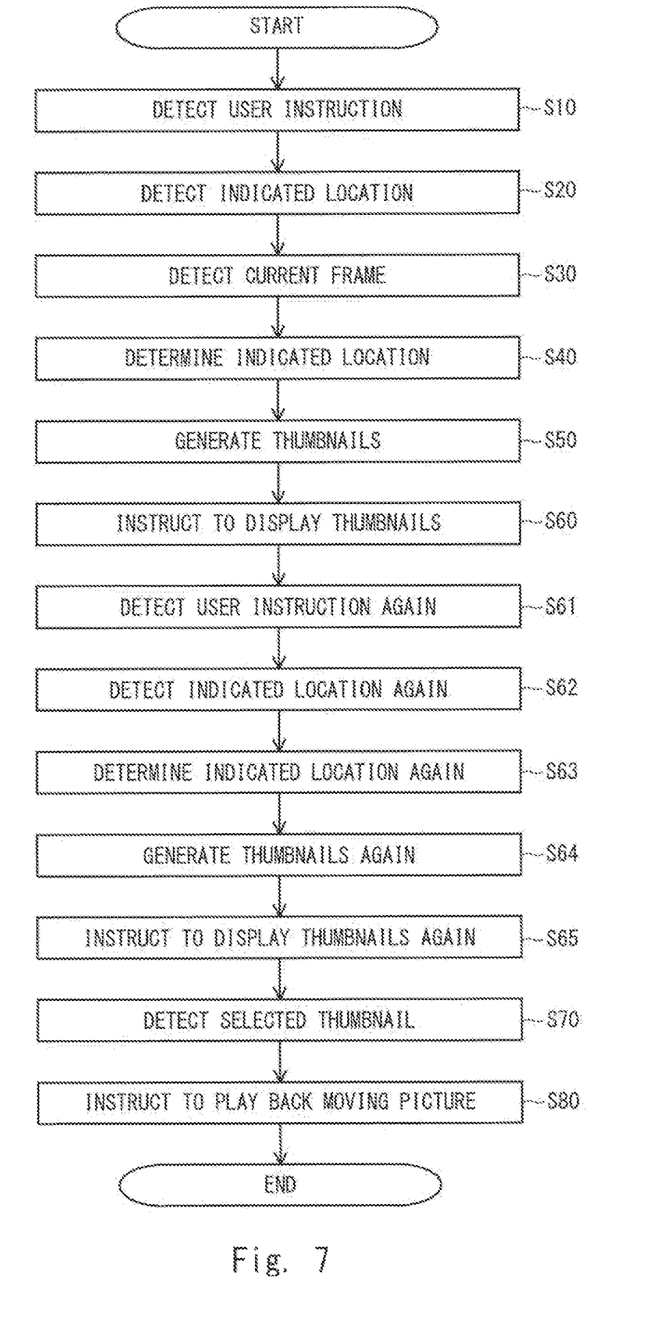
FIG. 7 is a flowchart showing a processing procedure of a moving picture playback method according to a second exemplary embodiment.

FIG. 7 is a flowchart showing a processing procedure of a moving picture playback method according to the second exemplary embodiment.

Each of processes in steps S10 to S60, S70 and S80 may be similar to that in the first exemplary embodiment, and therefore repeated explanations of them are omitted here.

Figure 8:
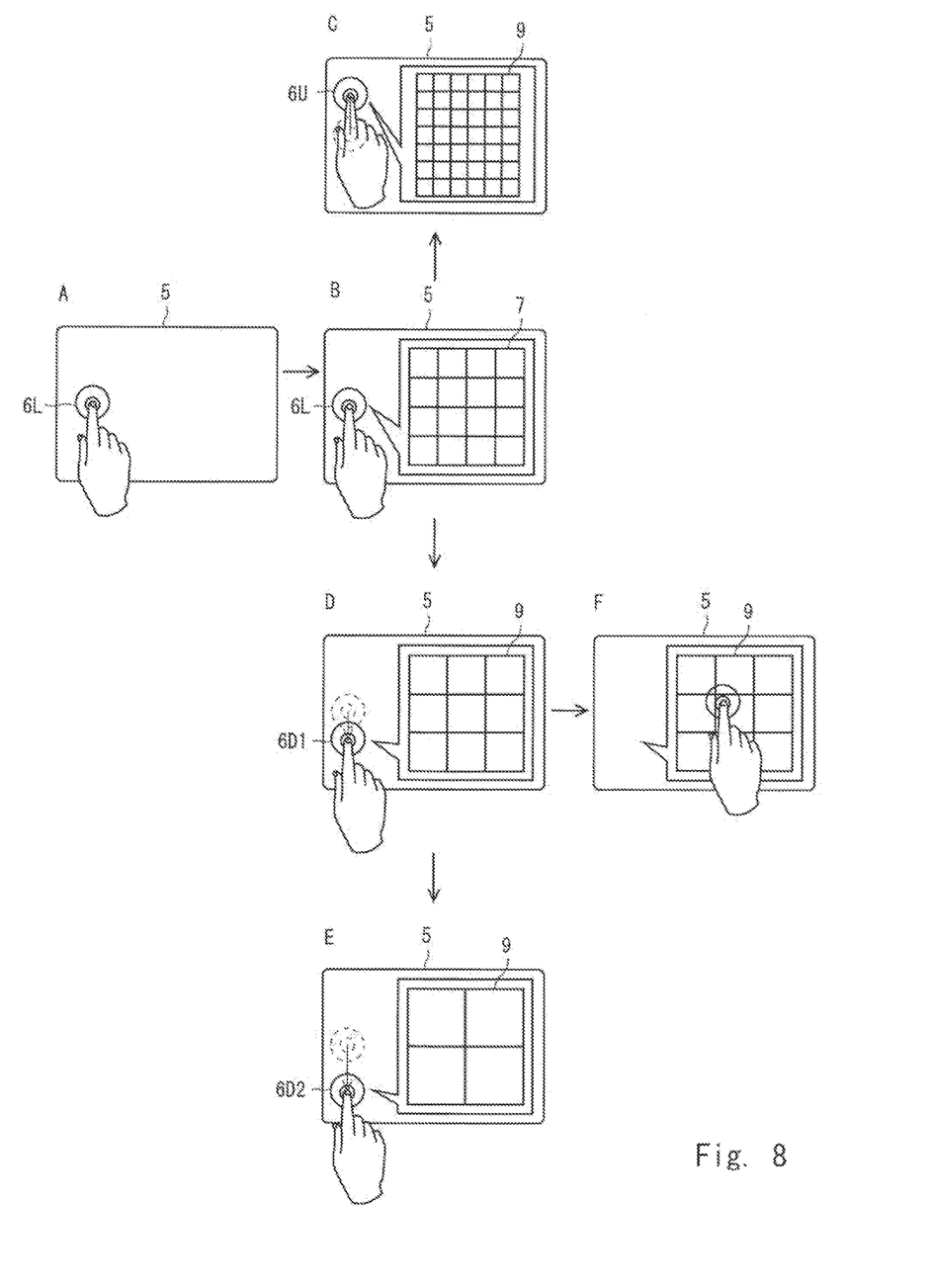
FIG. 8 is a diagram for explaining a thumbnail re-generation process and a thumbnail re-display process in the moving picture playback method according to the second exemplary embodiment.

FIG. 8 is a diagram for explaining a thumbnail re-generation process and a thumbnail re-display process in the moving picture playback method according to the second exemplary embodiment. FIGS. 8A and 8B correspond to FIGS. 4A and 5A, respectively.

When the thumbnail display instruction unit 35 displays a plurality of thumbnails 7 in a fast-forwarding direction in response to a long-press action performed by a user as shown in FIG. 8B (step S60), the user slides his/her finger upward or downward, or taps again a location above or below the original touch location to re-indicate a location (a second location) 6U, 6D1 or 6D2 in the moving picture display area 5 as shown in FIGS. 8C, 8D and 8E.

As a result, the operation receiving unit 20 detects this re-indication and outputs information about this re-indication to the image signal processing unit 30 (step S61).

Next, the location detection unit 31 detects the location 6U, 6D1 or 6D2 in the moving picture display area 5 where the user slid his/her finger or tapped again in the step S61 and outputs the detected location to the location determination unit 33 (step S62).

Next, the location determination unit 33 determines whether the location (the second location) 6U, 6D1 or 6D2 where the user slid his/her finger or tapped again is located above the location (the first location) 6L where the user has performed the long-press action or below that location (the first location) 6L and outputs the determination result to the thumbnail generation unit 34 (step S63).

Next, when the location 6U where the user slid his/her finger or tapped again is located above the location 6L where the user has performed the long-press action, the thumbnail generation unit 34 re-generates a larger number of thumbnails 9 of frames than the number (the first number) of thumbnails generated in the step S50 and outputs the generated thumbnails 9 to the thumbnail display instruction unit 35. On the other hand, when the location 6D1 or 6D2 where the user slid his/her finger or tapped again is located below the location 6L where the user has performed the long-press action, the thumbnail generation unit 34 re-generates a smaller number of thumbnails 9 of frames than the number (the first number) of thumbnails generated in the step S50 and outputs the generated thumbnails 9 to the thumbnail display instruction unit 35 (step S64).

Note that the thumbnail generation unit 34 changes the number of thumbnails 9 in such a manner that the higher the location 6U where the user slid his/her finger or tapped again is in the moving picture display area 5, the more the thumbnail generation unit 34 increases the number of re-generated thumbnails 9. Further, the lower the location 6D1 or 6D2 where the user slid his/her finger or tapped again is in the moving picture display area 5, the more the thumbnail generation unit 34 decreases the number of re-generated thumbnails 9.

Further, the thumbnail generation unit 34 can re-generate the thumbnails 9 by, for example, adding new thumbnails to the thumbnails 7 generated in the step S50 or deleting some of the thumbnails 7 generated in the step S50.

Next, as shown in FIGS. 8C, 8D and 8E, the thumbnail display instruction unit 35 instructs the image display unit 50 to display the thumbnails 9 re-generated by the thumbnail generation unit 34 in the step S64 through the panel control unit 40 (step S65).

Then, as shown in FIG. 8F, when the user selects one of the re-generated thumbnails 9, the selection detection unit 36 detects the thumbnail selected by the user and outputs information of the selected thumbnail 9 to the moving picture playback instruction unit 37 (step S70).

Next, the moving picture playback instruction unit 37 instructs the image signal processing unit 30 to play back the whole moving picture at the frame corresponding to the thumbnail 9 selected by the user in the step S70 and the subsequent frames, or play back at least a part of the moving picture, and instructs the image display unit 50 to display the moving picture through the panel control unit 40.

As described above, the moving picture playback apparatus 1 or the moving picture playback method according to the second exemplary embodiment is for, when a plurality of thumbnails of frames in a fast-forwarding direction or a rewinding direction are generated and displayed in a moving picture playback display area, re-generating and re-displaying thumbnails while changing the number of thumbnails based on an instruction from a user so that the user can search for a thumbnail more easily and/or the thumbnails can be viewed more easily (or can be displayed in a more easy-to-view arrangement).

Note that in the moving picture playback apparatus 1 or the moving picture playback method according to the second exemplary embodiment, a user instructs the moving picture playback apparatus to change the number of thumbnails by sliding his/her finger upward or downward and thereby using the location of his/her finger. However, a user may instruct the moving picture playback apparatus to change the number of thumbnails by using other types of actions such as increasing the pressing force of his/her finger on the touch panel 10 or rotating his/her finger in a clockwise or counter-clockwise direction.

As has been described above, a moving picture playback method according to the second exemplary embodiment further includes, between the thumbnail display instruction step S60 and the selection detection step S70: a location re-detection step S62 of detecting a second location 6 in the moving picture display area 5 indicated by a user; a location re-determination step S63 of determining a locational relation between the first location 6L or 6R and the second location 6U, 6D1 or 6D2; a thumbnail re-generation step S64 of: re-generating thumbnails 9 of frames temporally subsequent to the detected frame, the number of re-generated thumbnails 9 being changed from the first number; or re-generating thumbnails 9 of frames temporally previous to the detected frame, the number of re-generated thumbnails 9 being changed from the second number; and a thumbnail re-display instruction step S65 of displaying the re-generated thumbnails 9 in the moving picture display area 5.

Further, in the moving picture playback method according to the second exemplary embodiment, in the thumbnail re-generation step S64, when the second location is detected on one of two sides (i.e., both sides) of the first location 6L or 6R in a direction perpendicular to the direction in which the moving picture display area 5 is divided into the two parts, thumbnails are preferably re-generated while increasing the number of thumbnails, whereas when the second location is detected on the other side of the first location 6L or 6R in the direction perpendicular to the direction in which the moving picture display area 5 is divided into the two parts, thumbnails are preferably re-generated while decreasing the number of thumbnails.

That is, in the thumbnail re-generation step S64, when the moving picture display area 5 is divided into two parts, i.e., into a fast-forwarding instruction area and a rewinding instruction area in the left/right direction, the number of thumbnails is preferably changed based on a result of detection of a locational relation between the first location 6L or 6R and the second location in the vertical direction which is perpendicular to the dividing direction of the moving picture display area 5. Further, when the moving picture display area 5 is divided into two parts, i.e., into a fast-forwarding instruction area and a rewinding instruction area in the vertical direction, the number of thumbnails is preferably changed based on a result of detection of a locational relation between the first location and the second location in the left/right direction which is perpendicular to the dividing direction of the moving picture display area 5.

That is, in the thumbnail re-generation step S64, when the second location is detected on one of two sides of the first location 6L or 6R, thumbnails are preferably re-generated while increasing the number of thumbnails, whereas when the second location is detected on the other side of the first location 6L or 6R, thumbnails are preferably re-generated while decreasing the number of thumbnails.

Further, in the moving picture playback method according to the second exemplary embodiment, thumbnails 7 or 9 of frames to which tags are added in advance are preferably generated or re-generated in the thumbnail generation step S50 or the thumbnail re-generation step S64.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution. The first and second embodiments can be combined as desirable by one of ordinary skill in the art.

What is claimed is:

1. A moving picture playback method comprising:
    a location detection step of detecting a first location in a moving picture display area indicated by an interaction by a user with the moving picture display area;
    a frame detection step of detecting a frame displayed when the user indicates the first location;
    a location determination step of determining whether the first location is located in one of two divided areas or in the other thereof, the two divided areas being obtained by previously dividing the moving picture display area into two parts;
    a thumbnail generation step of generating a first number of thumbnails of frames temporally subsequent to the detected frame when the first location is located in the one of the two divided areas, and generating a second number of thumbnails of frames temporally previous to the detected frame when the first location is located in the other of the two divided areas;
    a thumbnail display instruction step of displaying the generated first or second number of thumbnails in one of the two divided areas that does not include the first location in the moving picture display area;
    a selection detection step of detecting a thumbnail selected from among the displayed first or second number of thumbnails by the interaction; and
    a moving picture playback instruction step of playing back a moving picture at a frame corresponding to the detected thumbnail and subsequent frames, and thereby displaying the moving picture in the moving picture display area,
    wherein the moving picture is played back at the frame corresponding to the detected thumbnail based on the selection detection step without removing the interaction with the moving picture display area between the location detection step and the moving picture playback instruction step.

2. The moving picture playback method according to claim 1, further comprising, between the thumbnail display instruction step and the selection detection step:
    a location re-detection step of detecting a second location in one of the two divided areas that includes the first location in the moving picture display area indicated by a user;
    a location re-determination step of determining a locational relation between the first location and the second location;
    a thumbnail re-generation step of: re-generating thumbnails of frames temporally subsequent to the detected frame, the number of re-generated thumbnails being changed from the first number; or re-generating thumbnails of frames temporally previous to the detected frame, the number of re-generated thumbnails being changed from the second number; and
    a thumbnail re-display instruction step of displaying the re-generated thumbnails in the moving picture display area.

3. The moving picture playback method according to claim 2, wherein in the thumbnail re-generation step, when the second location is detected on one of two sides of the first location in a direction perpendicular to the direction in which the moving picture display area is divided into the two parts, thumbnails are re-generated while increasing the number of thumbnails, whereas when the second location is detected on the other side of the first location in the direction perpendicular to the direction in which the moving picture display area is divided into the two parts, thumbnails are re-generated while decreasing the number of thumbnails.

4. The moving picture playback method according to claim 1, wherein in the thumbnail generation step or the thumbnail re-generation step, a thumbnail of a frame to which a tag is added in advance is generated or re-generated.

5. A moving picture playback apparatus comprising:
    a location detection unit configured to detect a first location in a moving picture display area indicated by an interaction by a user with the moving picture display area;
    a frame detection unit configured to detect a frame displayed when the user indicates the first location;
    a location determination unit configured to determine whether the first location is located in one of two divided areas or in the other thereof, the two divided areas being obtained by previously dividing the moving picture display area into two parts;
    a thumbnail generation unit configured to generate a first number of thumbnails of frames temporally subsequent to the detected frame when the first location is located in the one of the two divided areas, and generate a second number of thumbnails of frames temporally previous to the detected frame when the first location is located in the other of the two divided areas;
    a thumbnail display instruction unit configured to display the generated first or second number of thumbnails in one of the two divided areas that does not include the first location in the moving picture display area;
    a selection detection unit configured to detect a thumbnail selected from among the displayed first or second number of thumbnails by the interaction; and
    a moving picture playback instruction unit configured to play back a moving picture at a frame corresponding to the detected thumbnail and subsequent frames, and thereby display the moving picture in the moving picture display area,
    wherein the moving picture is played back at the frame corresponding to the detected thumbnail based on the selection detection step without removing the interaction with the moving picture display area between the location detection step and the moving picture playback instruction step.

6. The moving picture playback method according to claim 1, wherein the first location in the moving picture display area is indicated by a finger of the user, and the moving picture is played back at the frame corresponding to the detected thumbnail based on the selection detection step without detaching the finger of the user from the moving picture display area.

7. A non-transitory computer readable medium storing a moving picture playback program for causing a computer to execute:
- a location detection process of detecting a first location in a moving picture display area indicated by an interaction by a user with the moving picture display area;
- a frame detection process of detecting a frame displayed when the user indicates the first location;
- a location determination process of determining whether the first location is located in one of two divided areas or in the other thereof, the two divided areas being obtained by previously dividing the moving picture display area into two parts;
- a thumbnail generation process of generating a first number of thumbnails of frames temporally subsequent to the detected frame when the first location is located in the one of the two divided areas, and generating a second number of thumbnails of frames temporally previous to the detected frame when the first location is located in the other of the two divided areas;
- a thumbnail display instruction process of displaying the generated first or second number of thumbnails in one of the two divided areas that does not include the first location in the moving picture display area;
- a selection detection process of detecting a thumbnail selected from among the displayed first or second number of thumbnails by the interaction; and
- a moving picture playback instruction process of playing back a moving picture at a frame corresponding to the detected thumbnail and subsequent frames, and thereby displaying the moving picture in the moving picture display area,
wherein the moving picture is played back at the frame corresponding to the detected thumbnail based on the selection detection step without removing the interaction with the moving picture display area between the location detection step and the moving picture playback instruction step.

* * * * *